Sept. 10, 1963  W. R. MILLER  3,103,576

DISPOSABLE PROTECTIVE CAP ON CONTACT TUBE OF WELDING GUN

Filed Oct. 31, 1961

INVENTOR.
WILLIAM R. MILLER

BY

ATTORNEYS

United States Patent Office 3,103,576
Patented Sept. 10, 1963

3,103,576
DISPOSABLE PROTECTIVE CAP ON CONTACT TUBE OF WELDING GUN
William R. Miller, 1164 Bush Ave., Vallejo, Calif.
Filed Oct. 31, 1961, Ser. No. 149,133
10 Claims. (Cl. 219—130)
(Granted under Title 35, U.S. Code (1952), sec. 266)

The invention described herein may be manufactured and used by or for the Government of the United States of America for governmental purposes without the payment of any royalties thereon or therefor.

This invention relates to metal welding guns of the automatic electrode feed type and more specifically to the operation of directing a continuous feed aluminum wire electrode from the metal contact tube of the gun into the arc welding area.

Welding current is supplied from a power source by cable to the gun where it is conducted by the metal contact tube to the wire elctrode. Between the outboard end of the contact tube and the welding area, the electrode is subject to critical temperature fluctuations first as a result of its resistance since the entire welding current is carried by the electrode in this area, and second from heat conduction due to its proximity to the welding arc. Said temperature fluctuations in combination with variations in electrode feed and fusion rates may cause burnback to the extent that the electrode may fuse to the end of the contact tube. This is in turn blocks the electrode passage and causes the wire to kink or clog in its path and foul up the feeding mechanism requiring costly shut-downs.

The general purpose of this invention is to overcome the aforesaid objections by providing an apparatus and method for removing or at least reducing these troubles.

An object of the invention is to provide a barrier or shield between the end of the contact tube and the welding arc area to prevent the burn-back from reaching the contact tube proper.

Still another object is to provide a removable tip on the end of said contact tube which is automatically ejected from the tube upon fusion to the electrode as a result of burn-back thus shielding the contact tube proper from fusion.

Another object is to provide a method of welding procedure by employing a safety device in the form of a fusible barrier between the contact tube and arc area of a welding apparatus designed to absorb and dampen the burn-back travel to prevent it from reaching the tube by automatically moving the barrier further away from the tube and thus physically indicating the interruption so that remedial steps may be taken to stop the electrode feed before more permanent or accumulated damage is done to the gun.

An object is to provide an improved method for operating a welding apparatus of the type employing a continuously fed wire electrode, in a manner to prevent burnback fusion of the electrode to the contact tube by confining the fusion to a protective shield which is automatically ejected from the contact tube thus widening the protective barrier and providing a visual indication of the malfunction and warning to the operator to stop the operation.

Other objects and advantages will be pointed out or become apparent from the detailed description with reference to the accompanying drawings in which.

Figure 1:
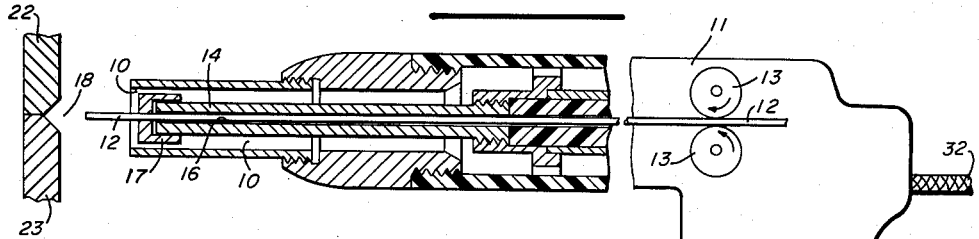
FIG. 1 is a front elevation partially in section illustrating a welding gun incorporating the proposed invention.

The gun 11 of FIG. 1 is of the inert gas type having a gas passage 10 and a detailed structure comprising a wire electrode 12 fed by rollers 13 through bore 16 of the contact tube 14. The shield or fusible cap 17 is mounted on the tube 14 by a press fit so that it may be readily ejected from the tube by a force equal to or less than the axial feed force on the wire electrode 12 set up by the feed rollers 13.

Figure 2:
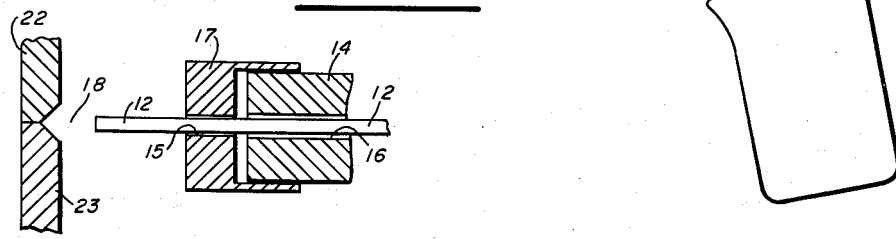
FIG. 2 is an enlarged sectional view showing the fusible shield mounted on the contact tube adjacent the arc welding area.
Figure 3:
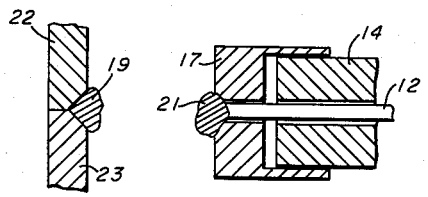
FIG. 3 is a view similar to FIG. 2 showing progressively the fusion of the elctrode and shield immediately after burnback.
Figure 4:
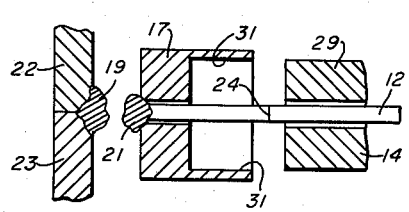
FIG. 4 is a view similar to FIG. 3 but showing progressively the shield being ejected from contact tube by the feed force of the wire electrode.

In FIG. 2 the wire elctrode 12 is shown in bore 16 of contact tube 14 and protruding through clearance bore 15 of shield 17 into the welding arc area 18 adjacent work pieces 22 and 23 to be welded. In FIG. 3 a bead 19 has been laid and an accidental burn-back 21 has occurred fusing the electrode 12 to the shield cap 17. In FIG. 4 the feed force of electrode 12 has dislodged or ejected the cap 17 from the contact tube 14. In other words, the retaining force of the press fit between counter bore 31 of shield 17 and outside diameter 29 of contact tube 14 is less than the longitudinal feed force of the electrode 12. When the shield 17 suspended on electrode 12 is positioned as shown in FIG. 4 the operator or welder presumably has turned off the welder and the shield 17 as fused at 21 to the electrode 12 may be sheared free at line 24. Then a replacement shield 17 may be inserted over the electrode 12 and press fitted into its starting position.

Figure 5:
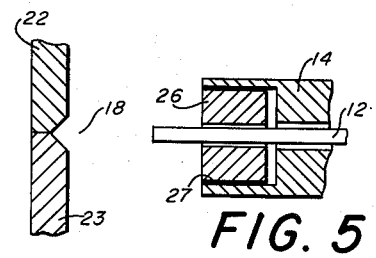
FIG. 5 illustrates a sectional view of a fusible plug employed as a shield and mounted in a counter-bore of the contact-tube by press fit.
Figure 6:
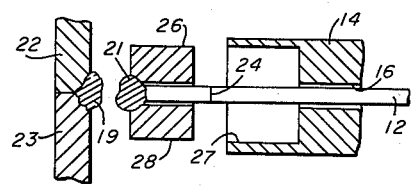
FIG. 6 is based on FIG. 5 showing progressively the plug shield ejected from the contact tube by the feed force of the wire electrode after fusion from burn-back.

A second species is shown in FIGS. 5 and 6 wherein a fusible plug 26 is press fitted into the counterbore 27 of a contact-tube 14. In similar manner the press fit between the counterbore 27 and the outside diameter 28 of the shielding plug 26 provides a retaining force approximately equal to or less than the feed force of the wire electrode, so that fusion 21, FIG. 6, resulting from accidental burn-back, will cause the feed force of the electrode 12 to eject the plug 26 from the counter-bore 27. The instant the operator notices the shield plug 26 is being ejected from the contact tube 14, he shuts off the apparatus which normally would place the elements in the relative positions illustrated in FIG. 6. The next step in the process is to shear the wire electrode at point 24 and discard the fused plug 26. A replacement shield plug 26 is then assembled over the electrode 12 and the plug pressed into counterbore 27 with the normal retention force.

In operation the gun 11 is moved into position to permit electrode 12 to contact work pieces 22 and 23 to be welded, and the feed rollers 13 started so that the electrode 12 will strike an arc in its normal operating advance position as shown in FIG. 2. In case of accidental burn-back the electrode will fuse to shield 17 as shown in FIG. 3 so that the cap 17 and electrode 12 will move to the left in unison under the force of the electrode feed and thus force the cap 17 off the contact tube 14 as illustrated in FIG. 4. The separation or mere movement of the cap 17 from the tube 14 normally provides a visual warning to the operator that fusion of the electrode 12 and cap 17 has resulted from accidental burn-back. The operator then stops the apparatus leaving the elements in the relative positions shown in FIG. 4. The next step in the process is to shear the electrode 12 at point 24 after which a replacement shield 17 may be mounted on the tube 14 and wire electrode 12, and the operation restarted.

In the above description operation of the gun is stopped by the welder as soon as he becomes aware of the malfunction. A further refinement is anticipated wherein a linkage between the shield 17 and trigger 33 will automatically release the trigger when the shield 17 is fused to the electrode and ejected from the contact-tube 14 whereby even in the absence of the welder a burn-back will automatically stop the operation and position the parts as illustrated in FIG. 4.

Other refinements of the device require that the cap 17 and tube 14 shall both be made of copper or at least be made of metals of similar thermal coefficients of expansion so that the press-fit will remain uniformly constant regardless of wide variations in temperature. Still another detail preference is that the base of cap 17 should be of a substantial thickness as compared with the side wall preferably three to one so that fusion thereto will tend to cool the electrode and terminate the extent of the burnback before it could burn through the cap base and reach the contact tube.

Obviously many modifications and variations of the present invention are possible in the light of the above teachings. It is therefore to be understood that within the scope of the appended claims the invention may be practiced otherwise than as specifically described.

What is claimed is:

1. In a welding gun for use with an apparatus employing an automatic continuous feed for the electrode, a tubular contact member of electrically conductive material, a fusible tip mounted on the end of said contact member adjacent the welding arc and a continuous wire welding electrode guided through the bore of said contact member and said tip toward the welding arc, said tip being made of a material to which the fused electrode will bond, said tip being fitted to said contact member by a predetermined press fit requiring a force approximately equal to the normal longitudinal feed force of the electrode to eject the tip from said contact member so that any burn back of the electrode fusing it to the tip will automatically cause the tip to be ejected from the contact member by the electrode feed force and prevent damaging back pressure to the electrode and feed mechanism.

2. A welding gun as described in claim 1 wherein said tubular contact member has a cylindrical surface and said fusible tip is cup shaped having an inside diameter slightly smaller than the outside diameter of the contact member to provide a press fit separable by a force equal to or less than the electrode feed force, and a center clearance hole in the base of said cup slightly larger than the electrode diameter and in line with the guide bore in said contact member.

3. A welding gun as described in claim 2 wherein the base of said cup shaped tip is preferably three times the thickness of the cylindrical wall so that the fusion of the electrode during burn-back will be confined to said tip.

4. A welding gun as described in claim 1 wherein the tip and contact tube will both be made of metals having similar thermal coefficients of expansion so that the press fit force will remain approximately constant and assure ejection regardless of the welding rod temperature.

5. A welding gun as described in claim 4 wherein the tip and contact tube are both made of copper.

6. In a welding apparatus employing an automatically fed electrode, a contact tube through which the electrode is guided toward the welding arc, a fusible shield to which the fused electrode will bond, said shield being located adjacent the electrode and positioned between the end of the contact tube and the welding arc area so that any burn-back will fuse the electrode to said shield before reaching the contact tube, said shield being supported by a frictional force equal to and opposing in direction the axial feed force of the electrode so that upon accidental fusion of the electrode to the shield the feed force of the electrode will automatically move the shield away from the contact tube and toward the welding arc where a replacement shield may be readily installed by the welder.

7. In a welding apparatus employing an automatic feed and wire electrode, an electrically conductive contact tube of fusible metal having a bore through which the electrode is fed toward the arc, a fusible shield made of the same metal as the tube and mounted between the tube and arc area and provided with a central aperture in line with said tube bore through which said electrode passes, said shield being made of a material to which the fused electrode will bond, said shield being held in its mounted position by a force approximately equal to the automatic feed force of said wire electrode so that fusion of the electrode and shield as a result of accidental burn-back will cause the electrode feed force to instantly move the shield away from said tube and prevent fusion with the contact tube.

8. In a welding apparatus employing a continuous aluminum wire electrode and automatic feed, a contact tube provided with a detachable fusible shield through which the aluminum electrode advances toward the welding arc, said shield being made of a material to which the fused aluminum electrode will bond, said shield being frictionally held on said tube and detachable therefrom by a force equal to or less than the feed force exerted by the advancing electrode so that fusion of the electrode to the shield as a result of accidental burn-back will automatically move the shield and electrode away from the tube in unison and prevent fusion thereto.

9. A method for preventing fusion of a welding electrode to the contact tube of a continuous feed welding gun resulting from accidental burn-back comprising the steps of encircling the electrode with a movable barrier interposed between the contact tube and the welding arc area, said barrier being made of a material to which the fused electrode will bond, retaining said barrier in this position with a force equal to and opposite the direction of the continuous feed force of the electrode, and stopping the gun operation when the barrier is automatically moved in unison with the electrode away from the contact tube indicating fusion resulting from burn-back.

10. A method for preventing a welding gun employing an automatic electrode feed from malfunctioning as a result of excessive burn-back of the electrode comprising the steps of providing a fusible barrier of a material to which the fused electrode will bond, inserting said fusible barrier provided with an aperture slightly larger than the electrode cross section between the end of the contact tube and the arc welding area, threading the electrode through said aperture adjacent said welding arc area, mounting said barrier on said contact tube by means providing a frictional force equal to or less than the normal feed force of the electrode and exerted in the opposite direction, and stopping the operation of the gun when the barrier is moved from its mounting position in unison with the electrode indicating fusion of the barrier to the electrode resulting from accidental burn-back.

References Cited in the file of this patent

UNITED STATES PATENTS 2,735,920    Valliere _____ Feb. 21, 1956